(12) United States Patent
Khoury et al.

(10) Patent No.: US 11,838,775 B2
(45) Date of Patent: Dec. 5, 2023

(54) REQUEST FOR SYNCHRONIZED PACKET AND ANALYTICS CAPTURE

(71) Applicant: ARRIS Enterprises LLC, Suwanee, GA (US)

(72) Inventors: Peter G. Khoury, San Francisco, CA (US); Mark A. Hamilton, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 10 days.

(21) Appl. No.: 17/355,415

(22) Filed: Jun. 23, 2021

(65) Prior Publication Data

US 2022/0014448 A1 Jan. 13, 2022

Related U.S. Application Data

(60) Provisional application No. 63/049,225, filed on Jul. 8, 2020.

(51) Int. Cl.
*H04L 41/22* (2022.01)
*H04L 41/5074* (2022.01)
(Continued)

(52) U.S. Cl.
CPC ............ *H04W 24/06* (2013.01); *H04L 41/22* (2013.01); *H04L 41/5074* (2013.01); *H04L 43/02* (2013.01); *H04L 43/04* (2013.01); *H04L 43/106* (2013.01); *H04L 43/12* (2013.01); *H04W 24/08* (2013.01); *H04W 24/10* (2013.01); *H04W 84/02* (2013.01); *H04W 84/12* (2013.01); *H04W 88/02* (2013.01); *H04W 88/08* (2013.01); *H04W 88/12* (2013.01); *H04W 88/18* (2013.01); *H04W 92/02* (2013.01); *H04W 92/08* (2013.01); *H04W 92/10* (2013.01); *H04W 92/12* (2013.01)

(58) Field of Classification Search
CPC ............ G06F 3/01; G06F 3/048–04897; H04J 3/06–076; H04B 17/0082–3913; H04L 41/02–5096; H04L 43/02–55; H04W 24/02–10; H04W 84/02–16; H04W 88/02–12; H04W 92/02; H04W 92/04; H04W 92/10

See application file for complete search history.

(56) References Cited

U.S. PATENT DOCUMENTS

| | | | |
|---|---|---|---|
| 2003/0012163 A1* | 1/2003 | Cafarelli | H04W 24/00 |
| 2015/0281028 A1* | 10/2015 | Akhter | H04L 43/106 |
| 2018/0288632 A1* | 10/2018 | Vadlamudi | H04L 43/045 |

* cited by examiner

*Primary Examiner* — Timothy J Weidner
(74) *Attorney, Agent, or Firm* — Steven Stupp; Stewart Wiener

(57) ABSTRACT

An electronic device that coordinates collection of communication data in a wireless network is described. During operation, the electronic device may provide, from an interface circuit, a troubleshooting request, where the troubleshooting request instructs at least a second electronic device (such as an access point) in the one or more second electronic devices to capture the communication data associated with subsequent communication by the electronic device. For example, the troubleshooting request may be included in a vendor specific public action frame that is broadcast or unicast. Then, the electronic device may provide, from the interface circuit, one or more packets or frames. Moreover, the electronic device may collect the communication data associated with the subsequent communication.

20 Claims, 6 Drawing Sheets

(51) Int. Cl.
*H04L 43/02* (2022.01)
*H04L 43/04* (2022.01)
*H04L 43/106* (2022.01)
*H04L 43/12* (2022.01)
*H04W 24/06* (2009.01)
*H04W 24/08* (2009.01)
*H04W 24/10* (2009.01)
*H04W 84/02* (2009.01)
*H04W 84/12* (2009.01)
*H04W 88/02* (2009.01)
*H04W 88/08* (2009.01)
*H04W 88/12* (2009.01)
*H04W 88/18* (2009.01)
*H04W 92/02* (2009.01)
*H04W 92/08* (2009.01)
*H04W 92/10* (2009.01)
*H04W 92/12* (2009.01)

ated ana-
REQUEST FOR SYNCHRONIZED PACKET AND ANALYTICS CAPTURE

CROSS REFERENCE TO RELATED APPLICATIONS

This application claims priority under 35 U.S.C. 119(e) to: U.S. Provisional Application Ser. No. 63/049,225, "Request for Synchronized Packet and Analytics Capture," filed on Jul. 8, 2020, by Peter G. Khoury et al., the contents of which are herein incorporated by reference.

FIELD

The described embodiments relate to techniques for synchronizing packet capture and collection of associated analytics by different electronic devices in a wireless network.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

For example, many electronic devices communicate with each other via wireless local area networks (WLANs) using an IEEE 802.11-compatible communication protocol (which are sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

One challenge associated with WLANs is in coordinating troubleshooting between an electronic device (which is sometimes referred to as a 'client' or a 'station') and an access point. Notably, when troubleshooting a communication issue, it is usually difficult to determine which end of a link is the source of the problem. Is it the fault of the client or the access point? This difficulty is often compounded by a lack of information. For example, data may only be logged or collected on one side of the link and there may not be any information available about what happened on the other side of the link. Thus, if an access point transmitted a packet to a client and it did not subsequently receive an acknowledgment, was this because the client did not receive the packet or because the access point did not receive the acknowledgment transmitted by the client?

In addition, existing approaches for troubleshooting are often cumbersome. For example, when a user is having a communication problem, they may contact an information technology (IT) support group for help. In response, the IT support group may request that the user provide an identifier of their electronic device (such as a media access control or MAC address), which is used to help diagnose the problem. However, this approach is typically time-consuming and involves manual effort by the user and the IT support group.

SUMMARY

In a first group of embodiments, an electronic device that coordinates collection of communication data is described. This electronic device may include: an interface circuit that communicates with one or more second electronic devices in a wireless network; a processor; and a memory that stores program instructions, where, when executed by the processor, the program instructions cause the electronic device to perform operations. Notably, during operation, the electronic device may provide, from the interface circuit, a troubleshooting request, where the troubleshooting request instructs at least a second electronic device in the one or more second electronic devices to capture the communication data associated with subsequent communication by the electronic device. Then, the electronic device may provide, from the interface circuit, one or more packets or frames. Moreover, the electronic device may collect the communication data associated with the subsequent communication.

Note that the communication data may include information about the one or more packets or frames provided by the interface circuit and/or analytics statistics associated with the communication by the electronic device.

Moreover, the electronic device may provide, from the interface circuit and addressed to at least the second electronic device, information that specifies the collected communication data.

Furthermore, the electronic device may receive user-interface activity information that indicates a user selection of a troubleshooting icon. The electronic device may provide the troubleshooting request in response to the user selection.

Additionally, the troubleshooting request may be included in a vendor specific public action frame.

In some embodiments, when the electronic device is not associated with the second electronic device, the interface circuit broadcasts the troubleshooting request. Note that the troubleshooting request may be provided at a lower data rate than is used when there is a connection between the electronic device and the second electronic device.

Alternatively, when the electronic device is associated with the second electronic device, the interface circuit may unicast the troubleshooting request to the second electronic device (i.e., the troubleshooting request is addressed to the second electronic device). Note that the troubleshooting request may be provided at a data rate that is used when there is a connection between the electronic device and the second electronic device.

Moreover, the troubleshooting request may include a timestamp associated with a clock domain of the electronic device. Additionally, the electronic device may provide, from the interface circuit, a synchronization packet that allows at least the second electronic device to synchronize collection of the communication data with the electronic device. Note that the synchronization packet may be provided at a lower data rate than is used in communication via a connection between the electronic device and the second electronic device.

Furthermore, the troubleshooting request may be signed (e.g., using a certificate) and/or encrypted.

Additionally, at least the second electronic device may include: an access point, an Evolved Node B (eNodeB), or a base station.

Another embodiment provides the second electronic device, which may perform counterpart operations to the operations performed by the electronic device. The second electronic device may store a timestamp in a clock domain of the second electronic device when the troubleshooting request is received. Moreover, the second electronic device may ignore repeated troubleshooting requests associated with the electronic device that are received within a time interval.

Another embodiment provides a computer-readable storage medium with program instructions for use with the electronic device or the second electronic device. When executed by the electronic device or the second electronic device, the program instructions cause the electronic device or the second electronic device to perform at least some of the aforementioned operations in one or more of the preceding embodiments.

Another embodiment provides a method, which may be performed by the electronic device or the second electronic device. This method includes at least some of the aforementioned operations in one or more of the preceding embodiments.

In a second group of embodiments, an electronic device that collects communication data is described. This electronic device may include: an interface circuit that communicates with a second electronic device in a wireless network; a processor; and a memory that stores program instructions, where, when executed by the processor, the program instructions cause the electronic device to perform operations. During operation, the electronic device may receive, at the interface circuit, a troubleshooting request associated with the second electronic device, where the troubleshooting request instructs the electronic device to capture the communication data associated with subsequent communication from the second electronic device. Then, the electronic device may receive, at the interface circuit, one or more packets or frames associated with the second electronic device. Next, the electronic device may collect the communication data associated with the subsequent communication.

Moreover, the electronic device may store a timestamp in a clock domain of the electronic device when the troubleshooting request is received.

Furthermore, the electronic device may ignore one or more troubleshooting requests associated with the second electronic device that are received within a time interval.

Additionally, the electronic device may ignore another troubleshooting request associated with the second electronic device when the other troubleshooting request is not signed using a certificate associated with the second electronic device.

Another embodiment provides a computer-readable storage medium with program instructions for use with the electronic device or the second electronic device. When executed by the electronic device or the second electronic device, the program instructions cause the electronic device or the second electronic device to perform at least some of the aforementioned operations in one or more of the preceding embodiments.

Another embodiment provides a method, which may be performed by the electronic device or the second electronic device. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
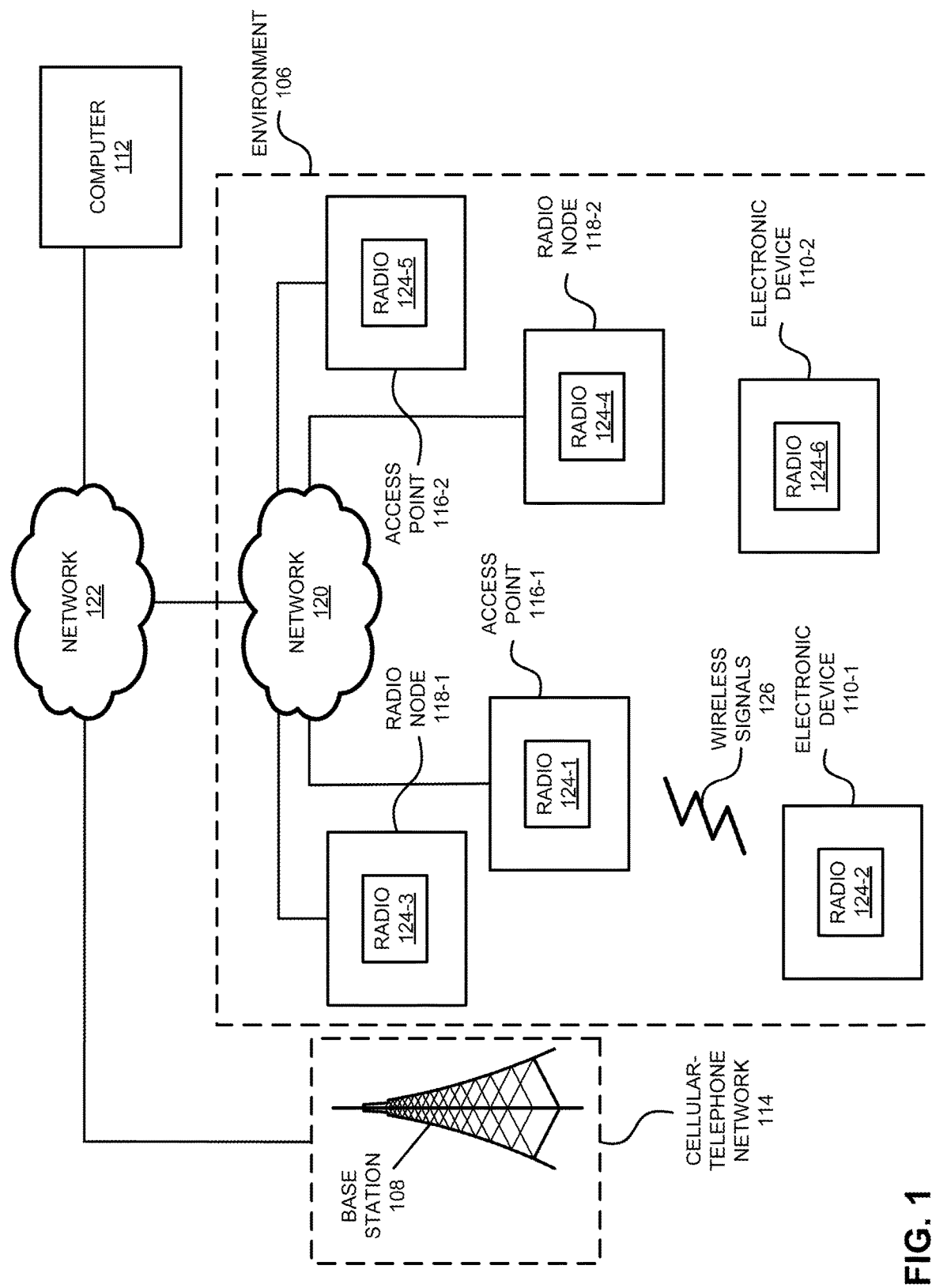
FIG. 1 is a block diagram illustrating an example of communication among electronic devices in accordance with an embodiment of the present disclosure.

An electronic device that coordinates collection of communication data in a wireless network is described. During operation, the electronic device may provide, from an interface circuit, a troubleshooting request, where the troubleshooting request instructs at least a second electronic device (such as an access point) in the one or more second electronic devices to capture the communication data associated with subsequent communication by the electronic device. For example, the troubleshooting request may be included in a vendor specific public action frame that is broadcast or unicast. Then, the electronic device may provide, from the interface circuit, one or more packets or frames. Moreover, the electronic device may collect the communication data associated with the subsequent communication.

By coordinating the collection of the communication data with at least the second electronic device, the communication techniques may facilitate troubleshooting of a communication problem in a wireless network (such as a WLAN) that includes the electronic device and the one or more second electronic devices. Notably, the communication techniques may ensure that the communication data is collected by both the electronic device and, e.g., at least the second electronic device. Therefore, the communication techniques may ensure that the communication data is collected on both sides of a link, e.g., between the electronic device and the second electronic device. Moreover, the communication techniques may automate the coordinated collection of the communication data. For example, the troubleshooting request may be provided in response to a user selection or activation of a troubleshooting icon in a user interface on the electronic device. This may reduce a need for a user of the electronic device to contact an IT support group for help in diagnosing and correcting a communication problem (and, thus, may reduce the support burden of the user on the IT support group). Consequently, the communication techniques may reduce the time, effort and complexity of diagnosing and correcting a communication problem in a wireless network.

In the discussion that follows, electronic devices or components in a wireless network communicate packets in accordance with a wireless communication protocol, such as: a wireless communication protocol that is compatible with an IEEE 802.11 standard (which is sometimes referred to as 'WiFi®,' from the Wi-Fi Alliance of Austin, Tex.), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node or a base station in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc.) via a cellular-telephone network 114 (which may include a base station 108), one or more access points 116 (which may communicate using Wi-Fi) and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a wireless local area network (WLAN), a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or computer 112 (which may be a cloud-based controller that manages and/or configures access points 116 and/or radio nodes 118, or that provides cloud-based storage and/or analytical services) using a wired communication protocol (such as Ethernet) via network 120 and/or 122. Note that networks 120 and 122 may be the same or different networks. For example, networks 120 and/or 122 may an intra-net or the Internet. In some embodiments, network 120 may include one or more routers and/or switches (not shown).

Figure 6:
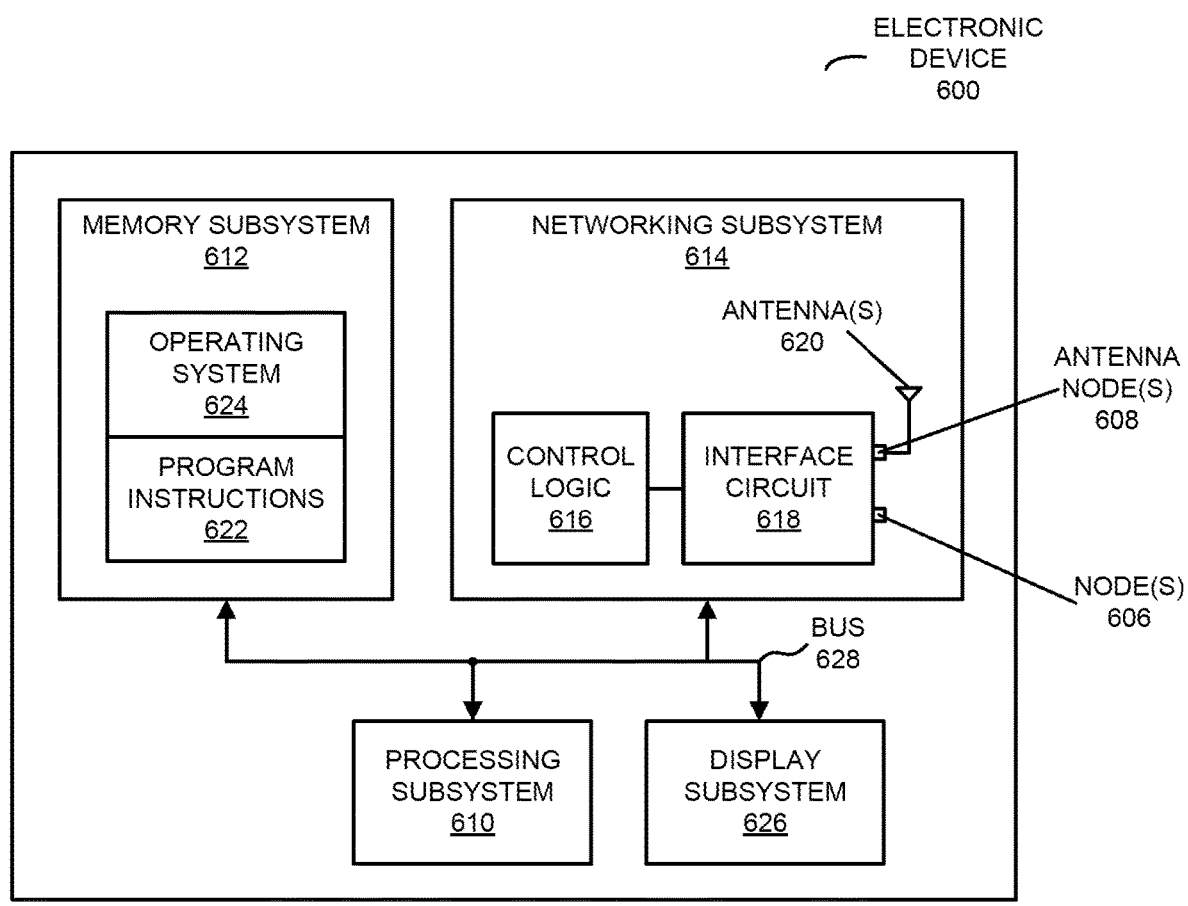
FIG. 6 is a block diagram illustrating an example of an electronic device in accordance with an embodiment of the present disclosure.

As described further below with reference to FIG. 6, electronic devices 110, computer 112, access points 116 and radio nodes 118 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While note shown in FIG. 1, in some embodiments there may be one or more routers or switches.

As discussed previously, because of a lack of information [II] it can be difficult to diagnose and correct communication problems. Moreover, existing approaches for collecting data are often cumbersome and time-consuming.

As described further below with reference to FIGS. 2-5, in order to address these problems a given one of electronic devices 110 (such as electronic device 110-1)) may perform the communication techniques in conjunction with one or more of access points 116 and/or one or more of radio nodes 118. For example, a software application may be downloaded and/or pre-installed on electronic device 110-1. (Alternatively, in some embodiments, the software application may be pushed or provided to electronic device 110-1, e.g., by access point 116-1, when there is an instance of the communication problem, such as automatically or in response to instruction from a network operator of the wireless network, which may be received from computer 112.) When executed by electronic device 110-1, this software application (such as a troubleshooting application) may display an icon in a user interface on a display of electronic device 110-1, such as a virtual icon in a user interface on a touch-sensitive display.

Moreover, when a communication problem occurs (such as a difficulty in associating or connecting with one of access points 116 and/or radio nodes 118, or a difficulty in communicating with one or more of access points 116 and/or radio nodes 118), a user of electronic device 110-1 may activate the icon. For example, the user may make contact with a surface of a touch-sensitive display in electronic device 110-1 within a virtual strike or contact area of a virtual icon in the user interface, and then may break contact with the surface of the touch-sensitive display. The act of contacting and then breaking contact with the surface of the touch-sensitive display within the contact area may active the icon. Moreover, this selection by the user may indicate or specify activation of a troubleshooting mode of operation of the troubleshooting application.

(While a virtual icon in a user interface displayed on a touch-sensitive display is used as an illustrative example in the preceding discussion, in other embodiments a variety of human-interface devices may be used by the user to provide the section, such as: a keyboard, a mouse, a track pad, a button, a knob, a stylus, a gesture-detection interface, and/or a voice-recognition interface.)

In response to this user-interface activity information (i.e., the user selection), electronic device 110-1 may provide a troubleshooting request. The troubleshooting request may instruct at least one of access points 116 and radio nodes 118 (such as access point 116-1) to capture communication data associated with subsequent communication from electronic device 110-1. Moreover, at least access point 116-1 may receive the troubleshooting request.

Then, electronic device 110-1 may provide one or more packets or frames. Moreover, electronic device 110-1 may collect the communication data associated with the subsequent communication. For example, electronic device 110-1 may store the communication data in a first log. In addition, at least access point 116-1 may receive the one or more packets or frames, and may also collect the communication data associated with the subsequent communication by electronic device 110-1, e.g., in a second log. Note that the communication data may include information about the one or more packets or frames provided by electronic device 110-1 and/or analytics statistics associated with the communication by the electronic device (such as statistics about the communication performance).

In embodiments where electronic device 110-1 communicates with at least access point 116-1, the troubleshooting request may be included in a vendor specific public action frame (and, more generally, another type of action frame). Moreover, when electronic device 110-1 is not associated with access point 116-1, electronic device 110-1 may broadcast the troubleshooting request. Note that the troubleshooting request may be provided by electronic device 110-1 at a lower data rate than is used when there is a connection between electronic device 110-1 and access point 116-1. Alternatively, when electronic device 110-1 is associated with or already has a connection with access point 116-1, electronic device 110-1 may unicast the troubleshooting request to access point 116-1 (i.e., the troubleshooting request may be addressed to access point 116-1). In these embodiments, the troubleshooting request may be provided at a data rate that is used when there is a connection between electronic device 110-1 and access point 116-1.

Furthermore, the troubleshooting request may include a timestamp associated with a clock domain of electronic device 110-1. This timestamp may allow access point 116-1 to detect and prevent a denial-of-service attack by a malicious actor. For example, access point 116-1 may reject any additional troubleshooting requests that are received from electronic device 110-1 within a time interval (such as 1, 5 or 10 min.) of a first troubleshooting request. (Thus, there may be a frequency constraint on the number of troubleshooting requests associated with electronic device 110-1 during a time interval.) Additionally, in order to prevent denial-of-service and/or replay attacks, electronic device 110-1 may sign the troubleshooting request (e.g., using a certificate that is stored on electronic device 110-1) and/or may encrypt the troubleshooting request. These operations, respectively, may establish that the troubleshooting request comes from a trusted source, and may prevent a malicious actor from accessing the contents of the troubleshooting request.

Additionally, access point 116-1 may store a timestamp in a clock domain of access point 116-1 when the troubleshooting request is received. In conjunction with a timestamp included in the troubleshooting request, this timing information may allow access point 116-1 to synchronize the collection of the communication data with electronic device 110-1, which may facilitate diagnosing (or identifying) and/or correcting of a communication problem.

In some embodiments, after providing the troubleshooting request electronic device 110-1 may provide a synchronization packet. This synchronization packet may allow access point 116-1 to synchronize collection of the communication data with electronic device 116-1. Note that the synchronization packet may be provided at a lower data rate than is used in communication via a connection between electronic device 110-1 and one of access point 116 or radio nodes 118 (such as access point 116-1).

Moreover, electronic device 110-1 may provide information that specifies the collected communication data to access point 116-1. This may allow access point 116-1 to, at least in part, diagnose the communication problem and, optionally, to correct it or report what is learned to computer 112, so that corrective action can be taken. Note that when there is not a connection between electronic device 110-1 and access point 116-1, the information may be provided via another communication path or link, such as via another one of access points 116, one of radio nodes 118, cellular-telephone network 114, the Internet, etc.

In some embodiments, at least some of the preceding operations may be performed by more than one of access point and/or radio node. For example, multiple access points 116 may receive the troubleshooting request (such as when electronic device 110-1 broadcasts the troubleshooting request) and may each of the recipients may collect the communication data.

Furthermore, in some embodiments, at least some of the preceding operations are performed in a centralized manner (instead of a distributed manner), such as by computer 112. For example, electronic device 110-1 and one or more of access points 116 or one or more of radio nodes 118 may provide the collected data to computer 112 (such as in response to an automatic request from computer 112 in response to the troubleshooting request, or in response to a request from a network operator of the wireless network, which may be received from computer 112). Then, computer 112 may use the collected data to diagnose the communication problem and, optionally, to correct it.

Note that in order to facilitate diagnosis and/or correction of the communication problem, the troubleshooting request may include one or more of: an identifier of electronic device 110-1, such as a MAC address, an association identifier (AID), a serial number, a model of electronic device 110-1, information about a type and/or a version of an operating system used by electronic device 110-1, and/or additional information.

In this way, the communication techniques may allow electronic device 110-1 and one or more of access points 116 or radio nodes 118 to collect the communication data in a coordinated or synchronized manner. Moreover, the communication techniques may make the collection of the communication data easier, simpler and less time-consuming. Consequently, the communication techniques may allow communication problems to be efficiently and accurately diagnosed and corrected, which may improve the communication performance in a wireless network (such as a WLAN, a small cell or a cellular-telephone network) and, thus, may improve the user experience when using the wireless network.

Figure 2:
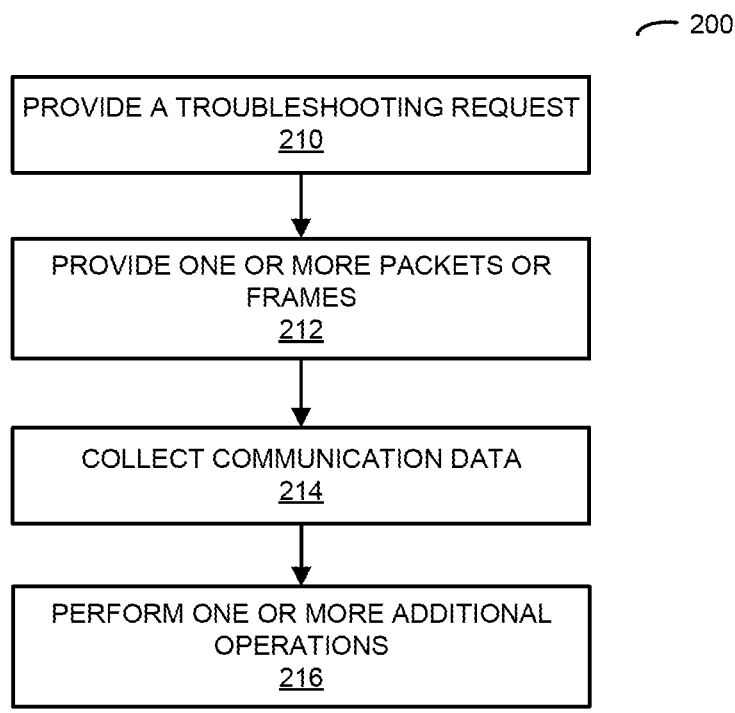
FIG. 2 is a flow diagram illustrating an example of a method for coordinating collection of communication data using an electronic device in FIG. 1 in accordance with an embodiment of the present disclosure.

We now describe embodiments of the method. FIG. 2 presents a flow diagram illustrating an example of a method 200 for coordinating collection of communication data, which may be performed by an electronic device, such as one of electronic devices 110 in FIG. 1. During operation, the electronic device may provide a troubleshooting request (operation 210), where the troubleshooting request instructs at least a second electronic device in one or more second electronic devices in a wireless network to capture the communication data associated with subsequent communication by the electronic device. Then, the electronic device may provide one or more packets or frames (operation 212). Moreover, the electronic device may collect the communication data (operation 214) associated with the subsequent communication.

Note that the communication data may include information about the one or more packets or frames provided by the electronic device and/or analytics statistics associated with the communication by the electronic device.

Moreover, the troubleshooting request may be included in a vendor specific public action frame.

In some embodiments, the electronic device may optionally perform one or more additional operations (operation 216). For example, the electronic device may receive user-interface activity information that indicates a user selection of a troubleshooting icon. The electronic device may provide the troubleshooting request in response to the user selection.

Moreover, the electronic device may provide, addressed to at least the second electronic device, information that specifies the collected communication data.

Furthermore, when the electronic device is not associated with the second electronic device, the electronic device may broadcast the troubleshooting request. Note that the troubleshooting request may be provided at a lower data rate than is used when there is a connection between the electronic device and the second electronic device.

Alternatively, when the electronic device is associated with the second electronic device, the electronic device may unicast the troubleshooting request to the second electronic device (i.e., the troubleshooting request is addressed to the second electronic device). Note that the troubleshooting request may be provided at a data rate that is used when there is a connection between the electronic device and the second electronic device.

Additionally, the troubleshooting request may include a timestamp associated with a clock domain of the electronic device. In some embodiments, the electronic device may provide a synchronization packet that allows at least the second electronic device to synchronize collection of the communication data with the electronic device. Note that the synchronization packet may be provided at a lower data rate that than is used in communication via a connection between the electronic device and the second electronic device.

Note the troubleshooting request may be signed (e.g., using a certificate) and/or encrypted.

Figure 3:
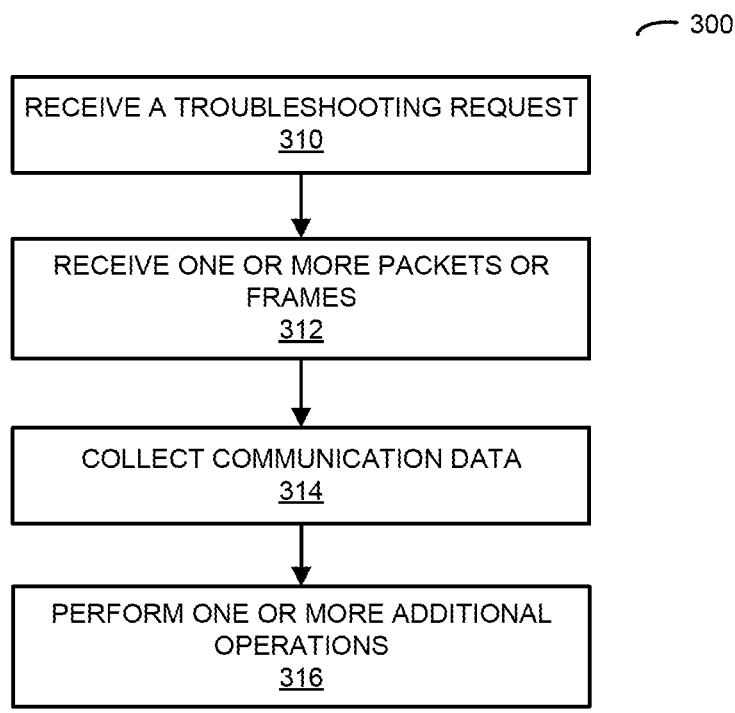
FIG. 3 is a flow diagram illustrating an example of a method for coordinating collection of communication data using another electronic device in FIG. 1 in accordance with an embodiment of the present disclosure.

FIG. 3 presents a flow diagram illustrating an example of a method 300 for coordinating collection of communication data, which may be performed by a second electronic device, such as one of access points 116 or one of radio nodes 118 in FIG. 1. During operation, the second electronic device may receive a troubleshooting request (operation 310) associated with an electronic device, where the troubleshooting request instructs at least the second electronic device to capture the communication data associated with subsequent communication by the electronic device. Then, the second electronic device may receive one or more packets or frames (operation 312) associated with the electronic device. Moreover, the second electronic device may collect the communication data (operation 314) associated with the subsequent communication.

Note that the communication data may include information about the one or more packets or frames provided by the electronic device and/or analytics statistics associated with the communication by the electronic device.

Moreover, the troubleshooting request may be included in a vendor specific public action frame.

In some embodiments, the second electronic device may optionally perform one or more additional operations (operation 316). For example, the second electronic device may receive, associated with the electronic device, information that specifies the collected communication data.

Moreover, the troubleshooting request may include a timestamp associated with a clock domain of the electronic device. Furthermore, the second electronic device may store a timestamp in a clock domain of the second electronic device when the troubleshooting request is received.

In some embodiments, the second electronic device may receive a synchronization packet that allows at least the second electronic device to synchronize collection of the communication data with the electronic device. Note that the synchronization packet may be provided at a lower data rate than is used in communication via a connection between the electronic device and the second electronic device.

Furthermore, the second electronic device may ignore one or more additional troubleshooting requests associated with the electronic device that are received within a time interval and/or that are not signed using a certificate associated with the electronic device.

In some embodiments of method 200 (FIG. 2) and/or 300, there may be additional or fewer operations. Furthermore, the order of the operations may be changed, and/or two or more operations may be combined into a single operation.

Figure 4:
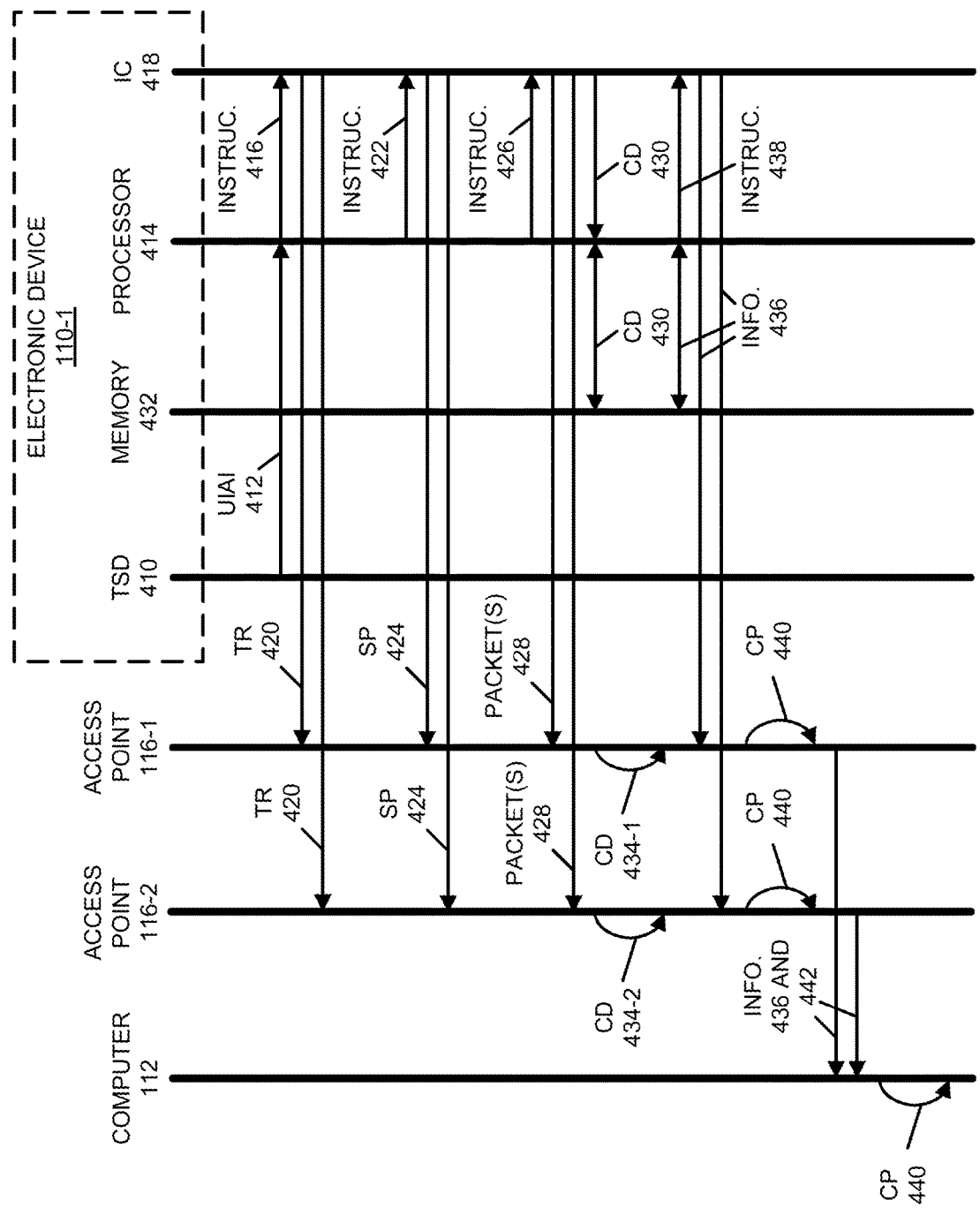
FIG. 4 is a drawing illustrating an example of communication among the electronic devices in FIG. 1 in accordance with an embodiment of the present disclosure.

Embodiments of the communication techniques are further illustrated in FIG. 4, which presents a drawing illustrating an example of communication among electronic device 110-1, access point 116-1, access point 116-1 and computer 112. In FIG. 4, when a communication problem 440 occurs, a user of electronic device 110-1 may activate a virtual icon in a user interface displayed on a display (such as touch-sensitive display or TSD 410) in electronic device 110-1. In response, touch-sensitive display 410 may provide user-interface activity information (UTAI) 412 that specifies this selection by the user to a processor 414 in electronic device 110-1.

Then, processor 414 may instruct 416 interface circuit 418 in electronic device 110-1 to provide a troubleshooting request (TR) 420 based at least in part on the selection specified in user-interface activity information 412. In response, interface circuit 418 may provide troubleshooting request 420, which may be received by access point 116-1 and/or access point 116-2. The troubleshooting request may instruct access point 116-1 and/or access point 116-2 to capture communication data associated with subsequent communication from electronic device 110-1.

Next, processor 414 may optionally instruct 422 interface circuit 418 to provide a synchronization packet (SP) 424. In response, interface circuit 418 may provide synchronization packet 424, which may be received by access point 116-1 and/or access point 116-2.

Furthermore, processor 414 may instruct 426 interface circuit 418 to provide one or more packets 428 or frames. In response, interface circuit 418 may provide the one or more packets 428 or frames, which may be received by access point 116-1 and/or access point 116-2.

Processor 414 may collect communication data (CD) 430 associated with the one or more packets 428 or frames, which may be stored in memory 432 in electronic device 110-1. In addition, access point 116-1 and/or access point 116-2 may store communication data 434 associated with the one or more packets 428 or frames.

Moreover, processor 414 may instruct 438 interface circuit 418 to provide information 436 that specifies the collected communication data 430 to access point 116-1 and/or access point 116-2. In response interface circuit 418 may provide information 436.

After receiving information 436, access point 116-1 and/or access point 116-2 may diagnose and/or optionally correct the communication problem (CP) 440 based at least in part on the collected communication data 434 and information 436. Alternatively, or additionally, access point 116-1 and/or access point 116-2 may provide information 436 and information 442 that specifies the collected communication data 434 to computer 112. In response, computer 112 may diagnose and/or optionally correct the communication problem 440.

While FIG. 4 illustrates communication between components using unidirectional or bidirectional communication with lines having single arrows or double arrows, in general the communication in a given operation in this figure may involve unidirectional or bidirectional communication. Moreover, while FIG. 4 illustrates operations being performed sequentially or at different times, in other embodiments at least some of these operations may, at least in part, be performed concurrently or in parallel.

Figure 5:
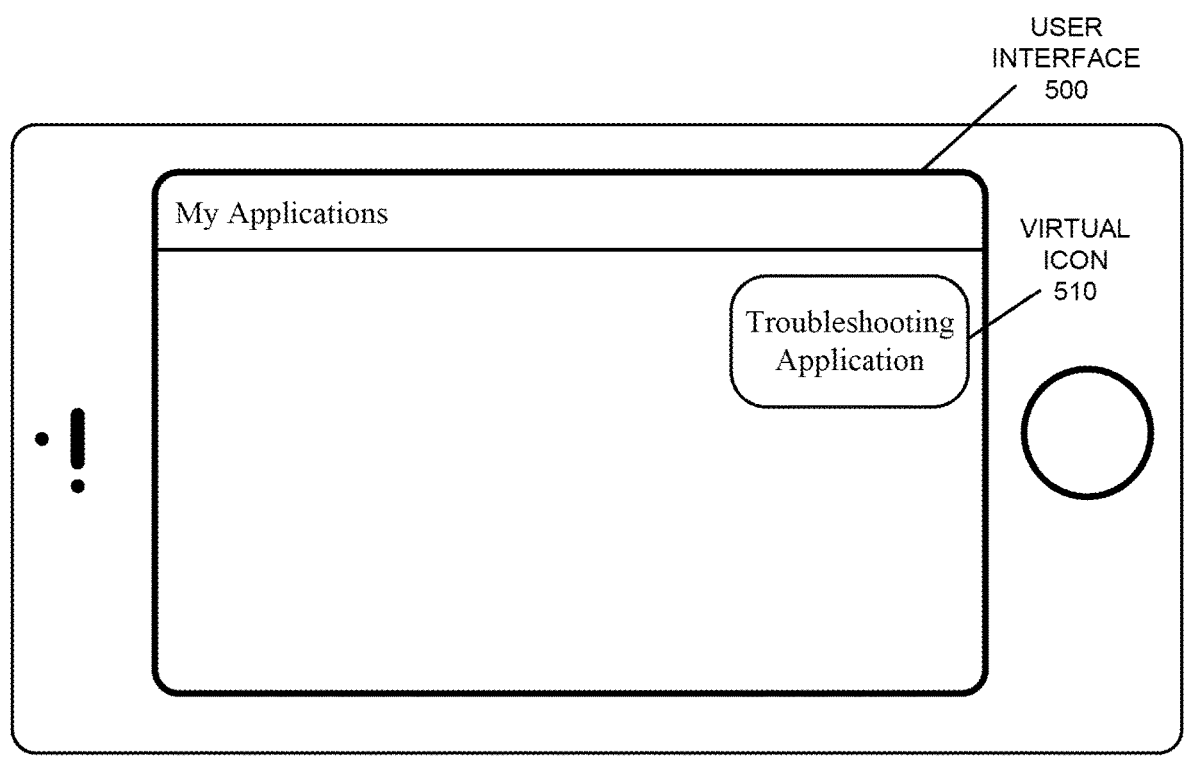
FIG. 5 is a drawing illustrating an example of a user interface displayed on one of the electronic devices in FIG. 1 in accordance with an embodiment of the present disclosure.

FIG. 5 presents a drawing illustrating an example of a user interface 500 displayed on electronic device 110-1. This user interface 500 may include a virtual icon 510 associated with a troubleshooting application that is executed by electronic device 110-1. When a user of electronic device 110-1 activates virtual icon 510, electronic device 110-1 may perform at least some of the operations in method 200 (FIG. 2), such as providing a troubleshooting request.

In some embodiments, the communication techniques facilitate coordinated collection of analytic and communication data to troubleshoot problems faster and understand performance better. The communication techniques may initiate a synchronized packet capture between a client and one or more access points (or radio nodes). For example, by activating a virtual icon or a button in a user interface on the client, a user may trigger the client to transmit a special packet capture or troubleshooting packet (which is sometimes referred to as a 'synchronized analytics request') to at least the access point. Any access point that receives this troubleshooting packet may start capturing packets and collecting analytics statistics for this and possibly other clients. Concurrently, the client may start capturing packets and collecting analytical statistics.

Note that network problems may occur even before a client is associated with an access point. In order to address this problem, the communication techniques may use a packet type that can be broadcast by the client at any time regardless of its association or connection state. For Wi-Fi, the client may use a vendor specific public action frame format. If a user of the client wants to initiate a troubleshooting session or mode prior to the client attempting to associate with an access point, then this frame may be broadcast and any access point that receives it may initiate packet capture. In these embodiments, the vendor specific public action frame may be sent at a low data rate to ensure that many access points can receive the frame.

Alternatively, if the client is associated with an access point, then the vendor specific public action frame may be unicast to the particular access point of interest. In these embodiments, the vendor specific public action frame may be sent at the typical data rate for the connection.

In some embodiments, even when a client has an established connection, it may still want to send a broadcast request for synchronized troubleshooting to help debug a particularly thorny performance problems, such as one involving interference between neighboring access points.

Moreover, in some embodiments of the communication techniques, there may be the need for the two ends of a link to precisely synchronize their analytics, such as their packet capture. One approach for doing this may be to timestamp the initial synchronized analytics request upon transmission by the client and receipt by the access point. This may require adjustment of subsequent event times, e.g., the timing of the packets received. For example, synchronization may be achieved (such as in the case of synchronized packet capture) by having the client transmit a synchronizing packet shortly after transmitting the synchronized analytics request. The synchronized analytics request may initiate the packet capture on the client and the access point, and then within a short time interval (such as, e.g., a couple of milliseconds or a couple of seconds) the client may send a synchronizing packet. The synchronizing packet may be transmitted at a low data rate to ensure reception by many access points. This may allow one or more of the access points to start and synchronize their packet capture, even if they are not being able to receive packets encoded at higher data rates.

From a security perspective, in the communication techniques there is the possibility that, without protection, a malicious actor may use the synchronized analytics request to initiate a denial of service attack. For example, an attacker may repeatedly replay the synchronized analytics request in order to flood the access point with requests. At a minimum, this type of attack may prevent an authorized user from accessing this capability. However, at worst, the access point may not be able to keep up with the synchronized analytics request, and may not be able to offer an appropriate level of service. In order to prevent this type of attack, in some embodiments the client may store a certificate to validate the synchronized analytics request. This certificate may be used by the client to sign and/or encrypt the synchronized analytics request, so that the access point knows that the synchronized analytics request is valid. Consequently, in these embodiments, any unsigned synchronized analytics request may be discarded and ignored.

Even with the signing technique, a determined denial-of-service malicious attacker may record and repeatedly replay a valid synchronized analytics request. In order to prevent this second type of attack, the synchronized analytics request may include a timestamp. The access point may only respond to a valid synchronized analytics request when the synchronized analytics request falls within a certain window or time interval of its own current clock time, which may be broadcast in beacons.

We now describe embodiments of an electronic device, which may perform at least some of the operations in the communication techniques. FIG. 6 presents a block diagram illustrating an example of an electronic device 600 in accordance with some embodiments, such as one of: base station 108, one of electronic devices 110, one of access points 116, one of radio nodes 118 or computer 112. This electronic device includes processing subsystem 610, memory subsystem 612, and networking subsystem 614. Processing subsystem 610 includes one or more devices configured to perform computational operations. For example, processing subsystem 610 can include one or more microprocessors, graphics processing units (GPUs), ASICs, microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program instructions 622 or operating system 624), which may be executed by processing subsystem 610. Note that the one or more computer programs, program modules or instructions may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as antenna nodes 608, e.g., a metal pad or a connector, which can be coupled to the one or more antennas 620, or nodes 606, which can be coupled to a wired or optical connection or link. Thus, electronic device 600 may or may not include the one or more antennas 620. Note that the one or more nodes 606 and/or antenna nodes 608 may constitute input(s) to and/or output(s) from electronic device 600.) For example, networking subsystem 614 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 600 may be adapted or changed using pattern shapers (such as directors or reflectors) and/or one or more antennas 620 (or antenna elements), which can be independently and selectively electrically coupled to ground to steer the transmit antenna pattern in different directions. Thus, if one or more antennas 620 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 600 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments instructions 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614 and/or of electronic device 600. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for interface circuit 618) or in firmware in interface circuit 618. Alternatively or additionally, at least some of the operations in the communication techniques may be implemented in a physical layer, such as hardware in interface circuit 618.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with one or more second electronic devices in a wireless network;
a processor; and
memory configured to store program instructions, wherein, when executed by the processor, the program instructions cause the electronic device to perform operations comprising:
providing, from the interface circuit, a troubleshooting request, where the troubleshooting request instructs at least a second electronic device in the one or more second electronic devices to capture communication data associated with subsequent communication by the electronic device, and wherein the electronic device is not associated with the second electronic device when the troubleshooting request is provided;
providing, from the interface circuit, one or more packets or frames; and
collecting the communication data associated with the subsequent communication between the electronic device and the second electronic device, wherein the collecting comprises the electronic device collecting at least a portion of the communication data and providing at least the portion of the communication data addressed to the second electronic device or a computer based at least in part on the troubleshooting request.

2. The electronic device of claim 1, wherein the communication data comprises information about the one or more packets or frames provided by the interface circuit and analytics statistics associated with the communication by the electronic device.

3. The electronic device of claim 1, wherein the operations comprise providing, from the interface circuit and addressed to at least the second electronic device, information that specifies the collected communication data.

4. The electronic device of claim 1, wherein the operations comprise receiving user-interface activity information that indicates a user selection of a troubleshooting icon; and
wherein the troubleshooting request is provided in response to the user selection.

5. The electronic device of claim 1, wherein the troubleshooting request is included in a vendor specific public action frame.

6. The electronic device of claim 1, wherein, when the electronic device is not associated with the second electronic device, providing the troubleshooting request comprises broadcasting the troubleshooting request.

7. The electronic device of claim 6, wherein the troubleshooting request is provided at a lower data rate than is used when there is a connection between the electronic device and the second electronic device.

8. The electronic device of claim 1, wherein, when the electronic device is associated with the second electronic device, providing the troubleshooting request comprises unicast transmission of the troubleshooting request addressed to the second electronic device.

9. The electronic device of claim 8, wherein the troubleshooting request is provided at a data rate that is used when there is a connection between the electronic device and the second electronic device.

10. The electronic device of claim 1, wherein the troubleshooting request comprises a timestamp associated with a clock domain of the electronic device.

11. The electronic device of claim 1, wherein the operations comprise providing, from the interface circuit, a synchronization packet that allows at least the second electronic device to synchronize collection of the communication data with the electronic device.

12. The electronic device of claim 11, wherein the synchronization packet is provided at a lower data rate than is used in communication via a connection between the electronic device and the second electronic device.

13. The electronic device of claim 1, wherein the troubleshooting request is signed using a certificate.

14. The electronic device of claim 1, wherein the troubleshooting request is encrypted.

15. The electronic device of claim 1, wherein the at least the second electronic device comprises an access point, an Evolved Node B (eNodeB), or a base station.

16. A non-transitory computer-readable storage medium for use in conjunction with an electronic device, the computer-readable storage medium storing program instructions that, when executed by the electronic device, cause the electronic device to perform operations comprising:
providing a troubleshooting request, where the troubleshooting request instructs at least a second electronic device in one or more second electronic devices in a wireless network to capture communication data associated with subsequent communication by the electronic device, wherein the electronic device is not associated with the one or more second electronic devices when the troubleshooting request is provided;
providing one or more packets or frames; and collecting the communication data associated with the subsequent communication between the electronic device and the second electronic device, wherein the collecting comprises the electronic device collecting at least a portion of the communication data and providing at least the portion of the communication data addressed to the second electronic device or a computer based at least in part on the troubleshooting request.

17. The non-transitory computer-readable storage medium of claim 16, wherein the operations comprise receiving user-interface activity information that indicates a user selection of a troubleshooting icon; and wherein the troubleshooting request is provided in response to the user selection.

18. The non-transitory computer-readable storage medium of claim 16, wherein the troubleshooting request is included in a vendor specific public action frame.

19. A method for coordinating collection of communication data, comprising:

by an electronic device:

providing a troubleshooting request, where the troubleshooting request instructs at least a second electronic device in one or more second electronic devices in a wireless network to capture communication data associated with subsequent communication by the electronic device, wherein the electronic device is not associated with the one or more second electronic devices when the troubleshooting request is provided;

providing one or more packets or frames; and collecting the communication data associated with the subsequent communication between the electronic device and the second electronic device, wherein the collecting comprises the electronic device collecting at least a portion of the communication data and providing at least the portion of the communication data addressed to the second electronic device or a computer based at least in part on the troubleshooting request.

20. The method of claim 19, wherein the troubleshooting request is included in a vendor specific public action frame.

* * * * *